US012019088B2

(12) United States Patent
Itoh (10) Patent No.: US 12,019,088 B2
(45) Date of Patent: Jun. 25, 2024

(54) DETECTION APPARATUS, SPECIMEN PROCESSING APPARATUS, AND SPECIMEN PROCESSING METHOD

(71) Applicant: Aoi Seiki Co., Ltd., Kumamoto-ken (JP)

(72) Inventor: Teruaki Itoh, Kumamoto (JP)

(73) Assignee: AOI SEIKI CO., LTD., Kumamoto (JP)

( * ) Notice: Subject to any disclaimer, the term of this patent is extended or adjusted under 35 U.S.C. 154(b) by 483 days.

(21) Appl. No.: 17/331,477

(22) Filed: May 26, 2021

(65) Prior Publication Data

US 2021/0373043 A1     Dec. 2, 2021

(30) Foreign Application Priority Data

May 28, 2020   (JP) ................. 2020-093091

(51) Int. Cl.
*G01N 35/04* (2006.01)
*G01C 9/02* (2006.01)
*G01N 35/00* (2006.01)

(52) U.S. Cl.
CPC ............... *G01N 35/04* (2013.01); *G01C 9/02* (2013.01); *G01N 35/00584* (2013.01)

(58) Field of Classification Search
None
See application file for complete search history.

(56) References Cited

U.S. PATENT DOCUMENTS

| 2009/0325299 A1 | 12/2009 | Hamada et al. |
| 2010/0233754 A1 | 9/2010 | Guex |
| 2014/0086808 A1 | 3/2014 | Itoh |
| 2016/0137426 A1 | 5/2016 | Itoh |
| 2017/0242046 A1 | 8/2017 | Yamasaki et al. |

FOREIGN PATENT DOCUMENTS

| CN | 101620234 A | 1/2010 |
| CN | 107076771 A | 8/2017 |
| EP | 3023793 A1 | 5/2016 |
| JP | H01127517 A | 5/1989 |
| JP | 2014035290 A | 2/2014 |
| JP | 2016-099142 A | 5/2016 |
| TW | 201429842 A | 8/2014 |
| WO | WO 2009/021266 A1 | 2/2009 |

OTHER PUBLICATIONS

Office Action received in Canadian Application No. 3,119,153; dated Jun. 10, 2022.
Office Action in TW 11021278860, dated Dec. 30, 2021.
Extended European Search Report received in Application No. 21174654.0, dated Nov. 17, 2021, in 6 pages.
Office Action in TW 110118294, dated Dec. 30, 2021.
Office Action received in Chinese Patent Application No. 202110585484.0, dated Oct. 27, 2023.
Office Action received in Japanese Patent Application No. 2020-093091, dated Nov. 28, 2023.

*Primary Examiner* — Daniel S Larkin
(74) *Attorney, Agent, or Firm* — Knobbe, Martens, Olson & Bear, LLP (57) ABSTRACT

According to an embodiment, a detection apparatus includes an inclination sensor arranged to be capable of inclining according to an outer shape of a specimen container, the inclination sensor configured to detect inclination information, and an information processor configured to detect posture information of the specimen container based on the inclination information.

7 Claims, 8 Drawing Sheets

DETECTION APPARATUS, SPECIMEN PROCESSING APPARATUS, AND SPECIMEN PROCESSING METHOD

CROSS-REFERENCE TO RELATED APPLICATION

This application is based upon and claims the benefit of priority from the prior Japanese Patent Application No. 2020-093091, filed May 28, 2020 the entire contents of which are incorporated herein by reference.

FIELD

The invention relates generally to a detection apparatus, a specimen processing apparatus, and a specimen processing method.

BACKGROUND

In the course of specimen processing, for example, testing and analyzing of blood or blood serum specimens, etc., specimen containers are held in their upright state by holders and conveyed so that the specimens undergo various processes conducted by various detection apparatuses arranged along a conveyance path. See, for example, Japanese Patent Application No. 2014-233954 (Jpn. Pat. Appln. KOKAI Publication No. 2016-099142).

Specimen processing of this type requires operations to detect the orientations of the specimen containers and align their postures, and as such, improved efficiency of the processing is desired.

SUMMARY

According to an aspect of the invention, a detection apparatus comprises an inclination sensor arranged to be capable of inclining according to an outer shape of a specimen container, the inclination sensor configured to detect inclination information, and an information processor configured to detect posture information of the specimen container based on the inclination information.

According to another aspect of the invention, the inclination sensor is at a tilting member comprising a detection surface facing an outer face of the specimen container, and the detection apparatus further comprises a mover supporting the tilting member in such a manner that the tilting member is tiltable, the mover configured to move the tilting member between a detecting position where the detection surface contacts the outer face of the specimen container and a standby position where the detection surface is away from the specimen container.

According to another aspect of the invention, the specimen container varies an outer diameter along an axial direction, the tilting member is a plate member, and the mover comprises a support shaft coupled to the plate member, a driver configured to reciprocate the support shaft, and a guide rail configured to guide the support shaft to move in a direction to approach or separate from the outer face of the specimen container.

According to another aspect of the invention, the specimen processing apparatus comprises the detection apparatus, a conveyor configured to convey the specimen container in a recumbent state to a point for detection by the inclination sensor, and a sorting device configured to align the orientation of the specimen container based on the posture information of the specimen container.

According to another aspect of the invention, the information processor is a controller configured to control the sorting device to change the posture of the specimen container based on the posture information so that a bottom of the specimen container is positioned on a lower side, and the sorting device comprises a catch mechanism configured to catch the specimen container in the recumbent state and release the specimen container, and a turning mechanism configured to turn the catch mechanism to raise the specimen container.

According to another aspect of the invention, a specimen processing method comprises, conveying a specimen container in a recumbent state along a predetermined conveyance path, detecting, by an inclination sensor, inclination information according to an outer shape of the specimen container, detecting posture information of the specimen container based on the inclination information, and aligning, by a turning mechanism configured to turn the specimen container in the recumbent state, the orientation of the specimen container based on the detected posture information of the specimen container.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION

First Embodiment

A specimen processing apparatus 10 according to the first embodiment of the invention will be described with reference to FIGS. 1 to 9. Note that the drawings may each show the components in an enlarged size or in a reduced size as appropriate, or may omit the components as appropriate. Arrows X, Y, and Z in the drawings represent three directions orthogonal to one another. For example, in the context of this embodiment, the arrow X conforms to the direction of conveyance by a conveyor 20, the arrow Y conforms to the direction of conveyance by a holder conveyor 60, and the arrow Z conforms to the vertical direction.

Figure 1:
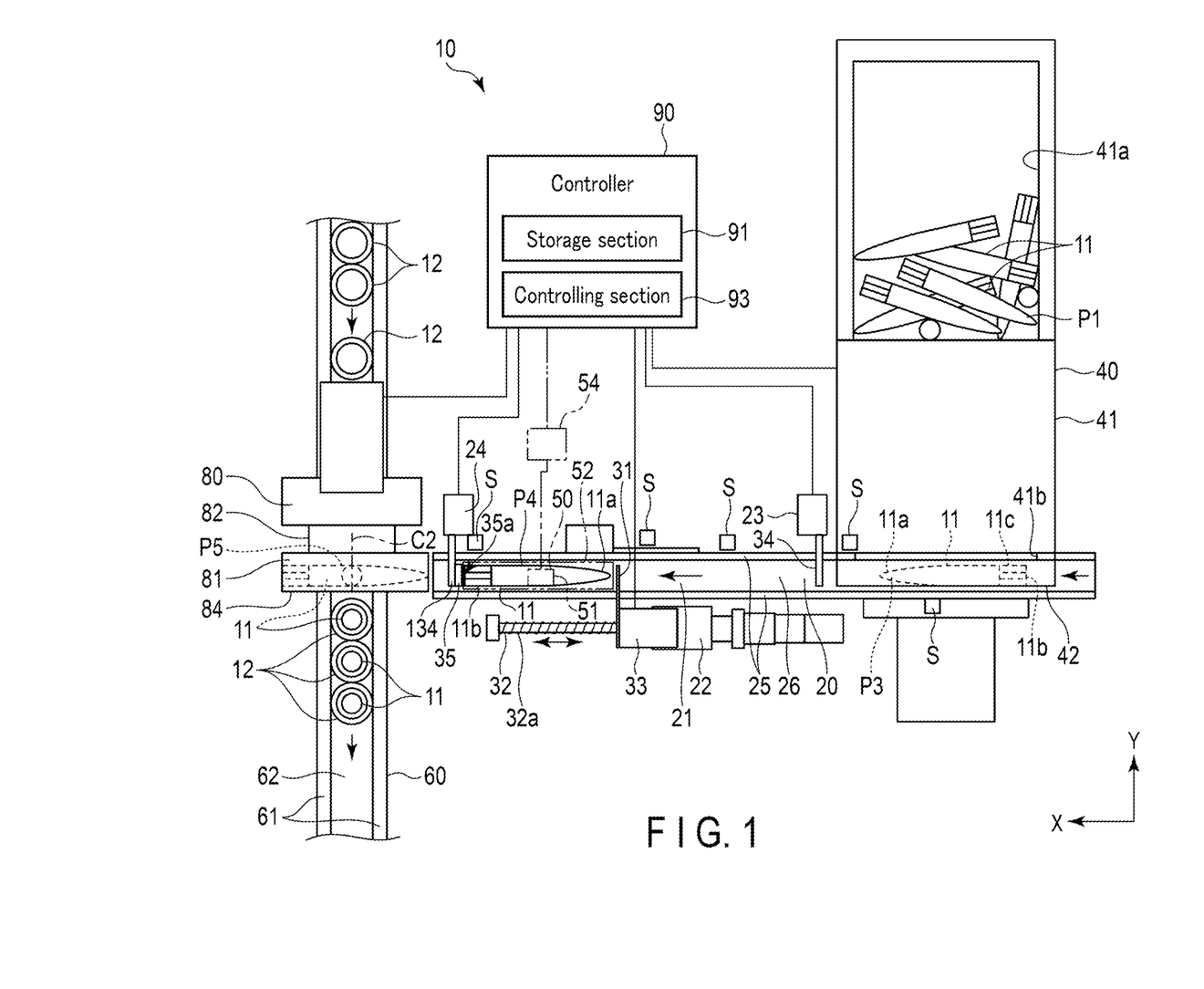
FIG. 1 is a plan view of a specimen processing apparatus according to a first embodiment of the invention.
Figure 2:
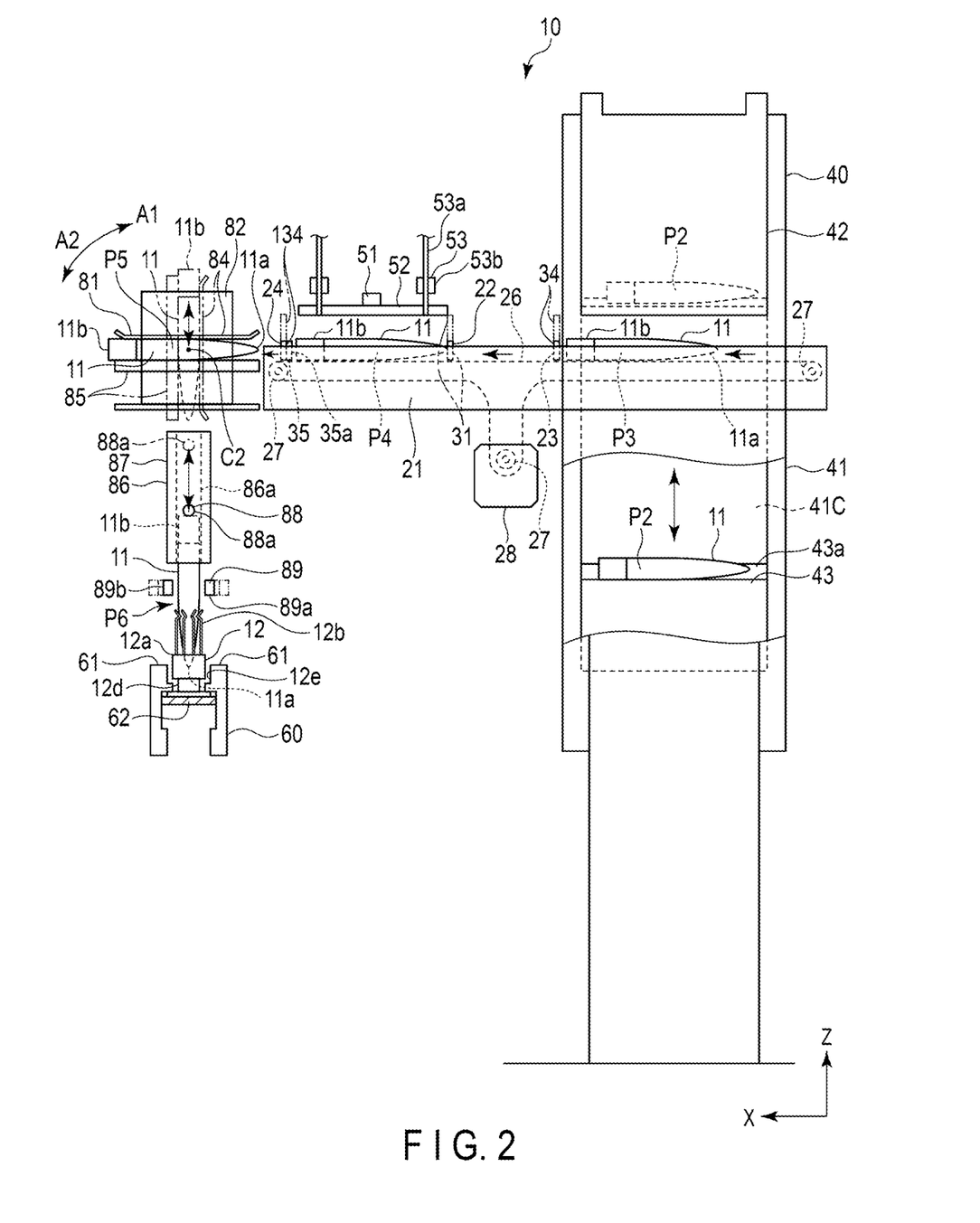
FIG. 2 is a front view of the specimen processing apparatus according to the embodiment.
Figure 3:
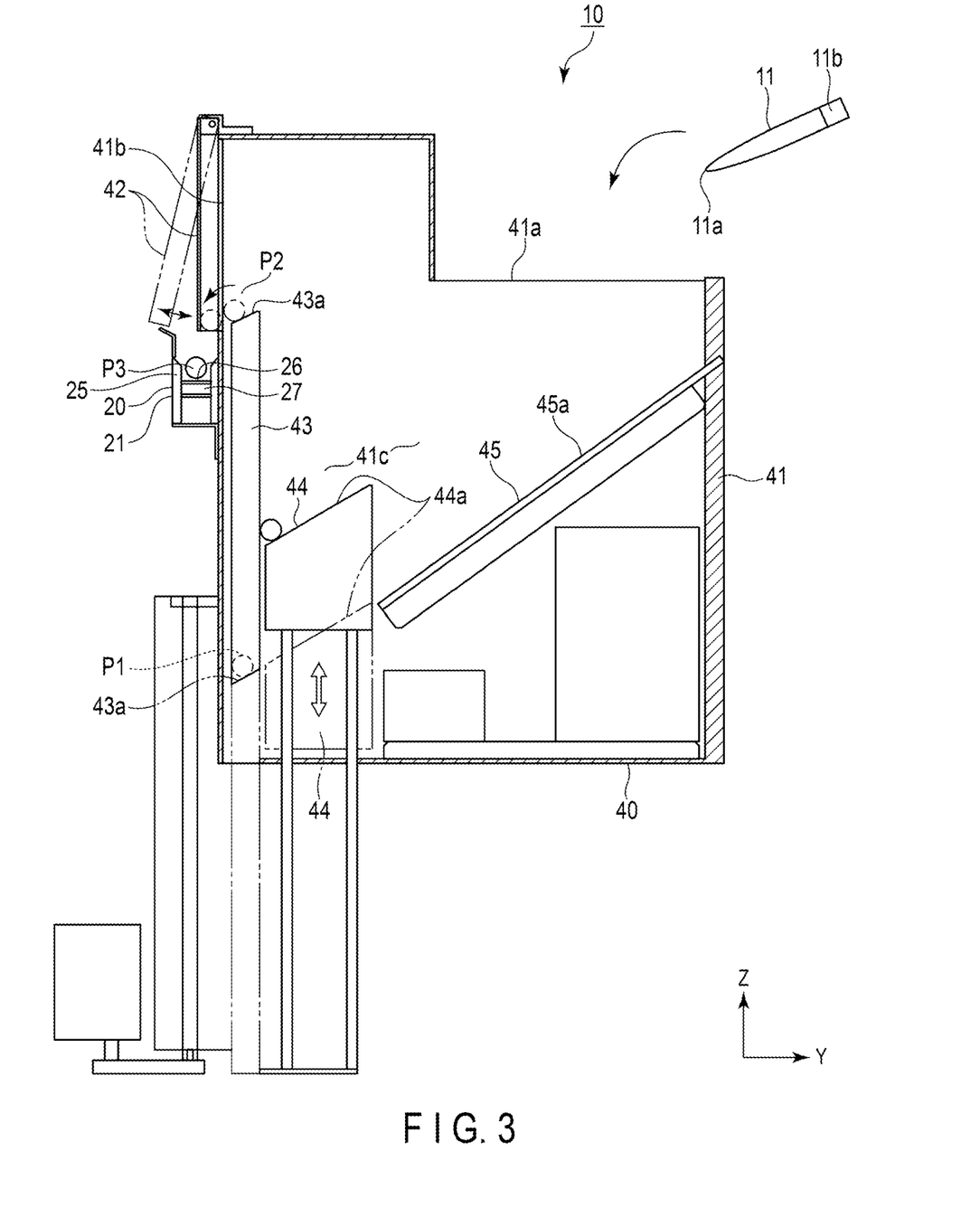
FIG. 3 is a diagram for explaining the specimen processing apparatus according to the embodiment.

FIG. 1 is a plan view of the specimen processing apparatus 10, and FIG. 2 is a front view of the specimen processing apparatus 10. FIG. 3 is a sectional view of a feeder 40 of the specimen processing apparatus 10.

The specimen processing apparatus 10 is an apparatus adapted to set, in advance of various tests, multiple specimen containers 11 onto a given holder conveyance path in their upright state. The specimen processing apparatus serves as, for example, a preprocessing apparatus for an analyzer.

The specimen processing apparatus 10 includes: the aforementioned conveyor 20 for conveying the specimen containers 11 being placed on in their recumbent state, in such a manner that they are guided along a predetermined path; the aforementioned feeder 40 for feeding the specimen containers 11 to the predetermined conveyance path in the recumbent state; a detection apparatus 50 (detector) for detecting posture information of the recumbent-state specimen containers 11; the aforementioned holder conveyor 60 for conveying holders 12 holding the respective specimen containers 11 along a predetermined path; an uprighting device 80 as a sorting device to turn and raise each specimen container 11 and to insert it into the corresponding holder 12; multiple sensors S for detecting the presence of the specimen containers 11 on the conveyance path and the arrival of the specimen containers 11 at a predetermined position; and a controller 90 for controlling operations of each component.

The controller 90 is connected to the components 20, 40, 50, 60, and 80, as well as to the position sensors S. The controller 90 includes a storage section 91 for storing various information, and a controlling section 93 (data processor) for controlling operations of each component through the data processing including calculation, determination, etc., based on identification information and so on. The controlling section 93 is constituted by, for example, processing circuitry including a processor, and controls each component so that various functions of the specimen processing apparatus 10 are realized according to an operating system or application programs.

The specimen containers 11 are, for example, each a tubular container made of a transparent resin material or glass. The specimen containers 11 may be test tubes or blood collection tubes. Each specimen container 11 has a bottom 11a and an open top 11b, i.e., a shape of a bottomed cylinder with an internal space for accommodating a specimen. As to its appearance, the outer face of the specimen container 11 varies in its diameter depending on the position in the axial direction so that when it is placed in the recumbent state, it has different heights at different positions in the axial direction. In an exemplary implementation, the specimen container 11 is formed by an injection molding technique, and increases its diameter toward the opening.

The specimen processing apparatus 10 can handle test tubes of different thicknesses and lengths. For example, multiple types of test tubes, including those with a thickness of φ13 mm or φ16 mm and a length of 75 mm or 100 mm, may be handled.

Each specimen container 11, at its top 11b where the opening is formed, is provided with a removable cap 11c for closing the opening. The caps 11c may be, for example, differently colored hemogard plugs or rubber plugs. The outer circumferential side of each specimen container 11 is affixed with, for example, a barcode containing the corresponding identification information.

The conveyor 20 includes a conveyance mechanism 21 for example of a conveyor belt type, a push-out mechanism 22 adapted to push and move the specimen container 11 in a predetermined direction, and stopper mechanisms 23 and 24 disposed at two respective points on the conveyance path so as to regulate the movement of the specimen containers 11.

The conveyance mechanism 21 includes: a pair of guide rails 25 extending along the predetermined conveyance path while keeping a constant distance from each other; a conveyor belt 26 made of, for example, a rubber material and disposed over the conveyance path with the guide rails on the respective sides; multiple conveyance rollers 27 arranged on the underside of the conveyor belt 26; and a motor 28 as a drive source to rotationally drive the conveyance rollers 27. Note that the conveyance path in this conveyance mechanism 21 is a path formed on the conveyor belt 26 for the specimen containers 11 to be conveyed, and is set along the X direction in the drawings. The conveyance mechanism 21 can convey the specimen containers 11 in their recumbent state, along the predetermined conveyance path that covers the location below a discharge port 41b of the feeder 40.

Rotation of the conveyance rollers 27 creates forward movement of the conveyor belt 26, whereby the specimen containers 11 placed on the conveyor belt 26 between the pair of guide rails 25 are guided and conveyed along the conveyance path while remaining in the recumbent state.

Figure 4:
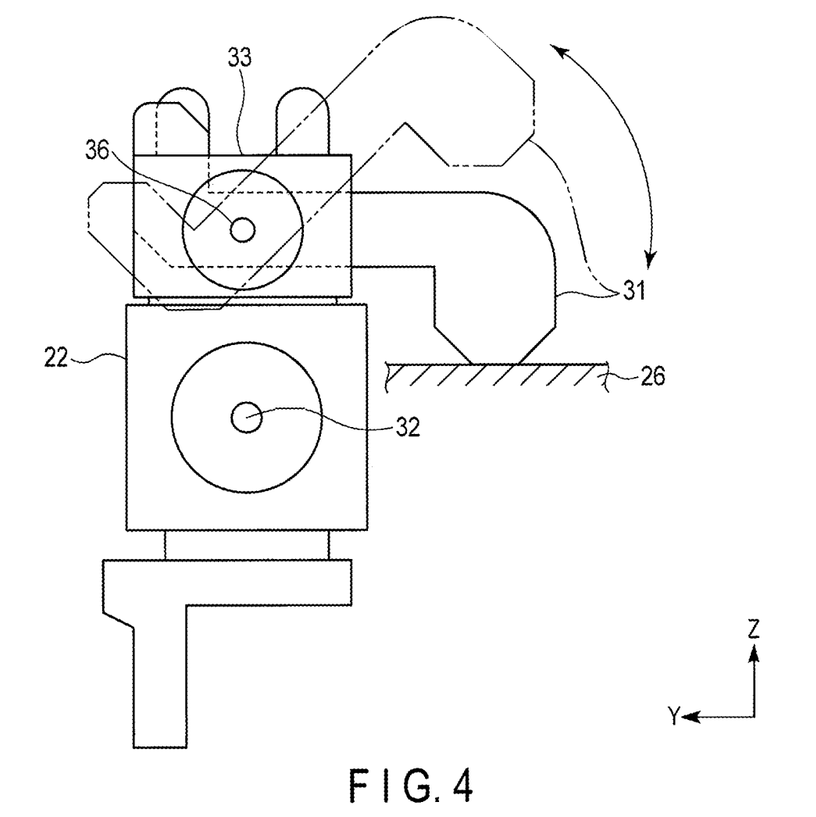
FIG. 4 is a diagram for explaining a push-out mechanism of the specimen processing apparatus.

FIG. 4 is a side view of the push-out mechanism 22. The push-out mechanism 22 includes a blade 31 adapted to enter and retreat from the conveyance path by swinging actions, a rotatable guide screw 32 provided beside the conveyance path, and a support 33 which engages with a spiral guiding engagement protrusion 32a formed on the outer circumference of the guide screw 32 to support the blade 31.

The blade 31 is adapted to swing at predetermined timings under the control of the controlling section 93. The blade 31 can swing back and forth about a given axis so that it reciprocates between an intervening position where the blade 31 has entered the conveyance path and interferes with the specimen container 11, and a retreat position where the blade 31 is away from the conveyance path so as not to interfere with the specimen container 11.

The guide screw 32 includes an axis along the conveyance direction, and the aforementioned guiding engagement protrusion 32a showing a spiral profile around the axis. The guide screw 32, with its axis positively and negatively rotated and stopped at predetermined timings in repeated fashion under the control of the controlling section 93, causes the support 33 to reciprocate in the forward and backward directions along the conveyance direction.

The blade 31 which is engaged with and supported by the engagement protrusion 32a via the support 33 reciprocates in the forward and backward directions of the conveyance path according to the rotational actions of the guide screw 32. The blade 31 enters the conveyance path, and in this state, it makes a forward movement in the conveyance direction according to the guide by the guide screw 32, so as to push out and move the specimen container 11 forward in the conveyance direction even when the conveyor belt 26 is stationary. The blade 31 retreats, and in this state, it makes a backward movement in the conveyance direction according to the guide by the guide screw 32, so as to return to the original position.

Figure 5:
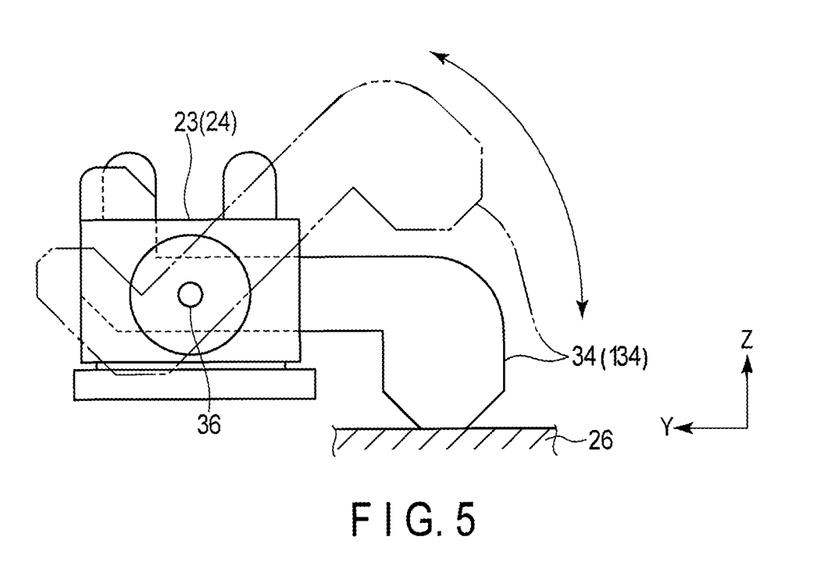
FIG. 5 is a diagram for explaining stopper mechanisms of the specimen processing apparatus.

FIG. 5 is a side view applicable to each of the stopper mechanisms 23 and 24 as viewed from the back in the conveyance direction. Among them, the stopper mechanism 23 disposed near the feeder 40 includes a blade 34 adapted to swing about a given axis 36. The blade 34 can enter and retreat from the conveyance path by swinging actions. The blade 34 is provided at a position that allows entry to the conveyance path.

The blade 34 is adapted to swing at predetermined timings under the control of the controlling section 93. The blade 34 can swing back and forth about the axis 36 so that it reciprocates between an intervening position where the blade 34 has entered the conveyance path and interferes with the specimen container 11, and a retreat position where the blade 34 is, for example, upwardly away from the conveyance path so as not to interfere with the specimen container 11. When the blade 34 has made its entry and is located on the conveyance path, the movement of the specimen container 11 is regulated by the blade 34, that is, the specimen container 11 is stopped, irrespective of the forward movement of the conveyor belt 26.

The other stopper mechanism 24 disposed at the end in the conveyance direction also includes a blade 134 adapted to swing about a given axis 36, as shown in FIG. 5. The blade 134 can enter and retreat from the conveyance path by swinging actions. The blade 134 is provided at a position that allows entry to the conveyance path.

As shown in FIG. 1, an abutment block 35 is provided on the backside of the blade 134 in the conveyance direction. The abutment block 35 is, for example, a rectangular parallelepiped block, and its rear end face in the conveyance direction serves as an abutment surface 35a to contact the specimen container 11. The abutment surface 35a forms a plane orthogonal to the conveyance direction.

The blade 134 is adapted to swing at predetermined timings under the control of the controlling section 93. The blade 134 can swing back and forth about the axis 36 so that it reciprocates between an intervening position where the blade 134 has entered the conveyance path and interferes with the specimen container 11, and a retreat position where the blade 134 is, for example, upwardly away from the conveyance path so as not to interfere with the specimen container 11. When the blade 134 has made its entry and is located on the conveyance path, the movement of the specimen container 11 is regulated by the blade 134, that is, the specimen container 11 is stopped, irrespective of the forward movement of the conveyor belt 26.

As shown in FIGS. 1 and 3 the feeder 40 includes: a housing box 41 as a housing portion which forms a housing space 41c for accommodating multiple specimen containers 11; a opening-closing door 42 provided at the discharge port 41b formed in the sidewall of the housing box 41; a lifting plate 43 adapted to ascend and descend within the housing box 41 to feed the specimen containers 11 to the discharge port 41b one by one; a drive source, such as an air cylinder, for causing the lifting plate 43 to ascend and descend; an auxiliary block 44 adapted to ascend and descend in the vicinity of the lifting plate 43 to assist the movement of the specimen containers 11; and a drive source such, as an air cylinder, for causing the auxiliary block 44 to ascend and descend.

The housing box 41 is provided adjacent to the conveyance path of the conveyor 20. The housing box 41 is a box having four sidewalls and a bottom wall, and forms an internal space for housing multiple specimen containers 11. The housing box 41 has a feed port 41a formed on its upper surface. The discharge port 41b is formed at the upper portion of one of the sidewalls that is beside the conveyance path. The opening-closing door 42 for opening and closing the discharge port 41b is swingably provided on the upper edge of the discharge port 41b. The lower edge of the discharge port 41b is at a level slightly higher than the conveyor belt 26. The conveyance path of the conveyor is located directly below the discharge port 41b, and the conveyor belt 26 is arranged to cover the location below the lower end of the opening-closing door 42.

In the internal space of the housing box 41, an inclined plate 45 is provided as a bottom surface having a downward inclination from the side of the feed port 41a toward the side of the discharge port 41b. This inclined plate 45 serves to gather randomly introduced specimen containers 11 to the side of the discharge port 41b.

In the housing box 41, the lifting plate 43 is provided adjacent to the inner face of the sidewall with the discharge port 41b. The lifting plate 43 can vertically ascend and descend using the drive source, as depicted by the arrows in the drawings. The lifting plate 43 has a top face 43a having a width allowing only one specimen container 11 to be placed. For example, the top face 43a has a width larger than the diameter of one specimen container 11 and smaller than double this diameter. Also, the top face 43a is inclined downwardly toward the side of the discharge port 41b. The ascending and descending actions of the lifting plate 43 lift up the specimen containers 11 one by one so that the specimen containers 11 sequentially pass through the discharge port 41b and are fed to the conveyance path on the conveyor belt 26 by the inclination of the top face 43a.

The auxiliary block 44 is provided adjacent to the back of the lifting plate 43. The auxiliary block 44 can vertically ascend and descend using the drive source, such as an air cylinder, as depicted by the arrows in the drawings. A top face 44a of the auxiliary block 44 forms an inclined surface which becomes continuous with an upper surface 45a of the inclined plate 45 when the auxiliary block 44 is in the lowered state and which also becomes continuous with the top face 43a of the lifting plate 43 when the lifting plate 43 is in the lowered state. Note that the inclination angle of the upper surface 45a of the inclined plate 45 is set to an inclination angle approximately equal to the inclination angle of the top face 44a of the auxiliary block 44, or set to have slightly steeper inclination than the top face 44a. Also, the top face 44a of the auxiliary block 44 has a slightly gentler inclination than the top face 43a of the lifting plate 43. With the ascending and descending actions of the auxiliary block 44, the specimen containers 11 randomly disposed within the housing space 41c and facing different directions are sequentially placed in the slot created above the lifting plate 43 one by one. At this time, the placed specimen container 11 has its longitudinal direction aligned with the X direction. Accordingly, the specimen containers 11 are individually sent to the discharge port 41b by the ascending action of the lifting plate 43, and fed onto the conveyor belt 26 via the opened opening-closing door 42 one by one.

Figure 6:
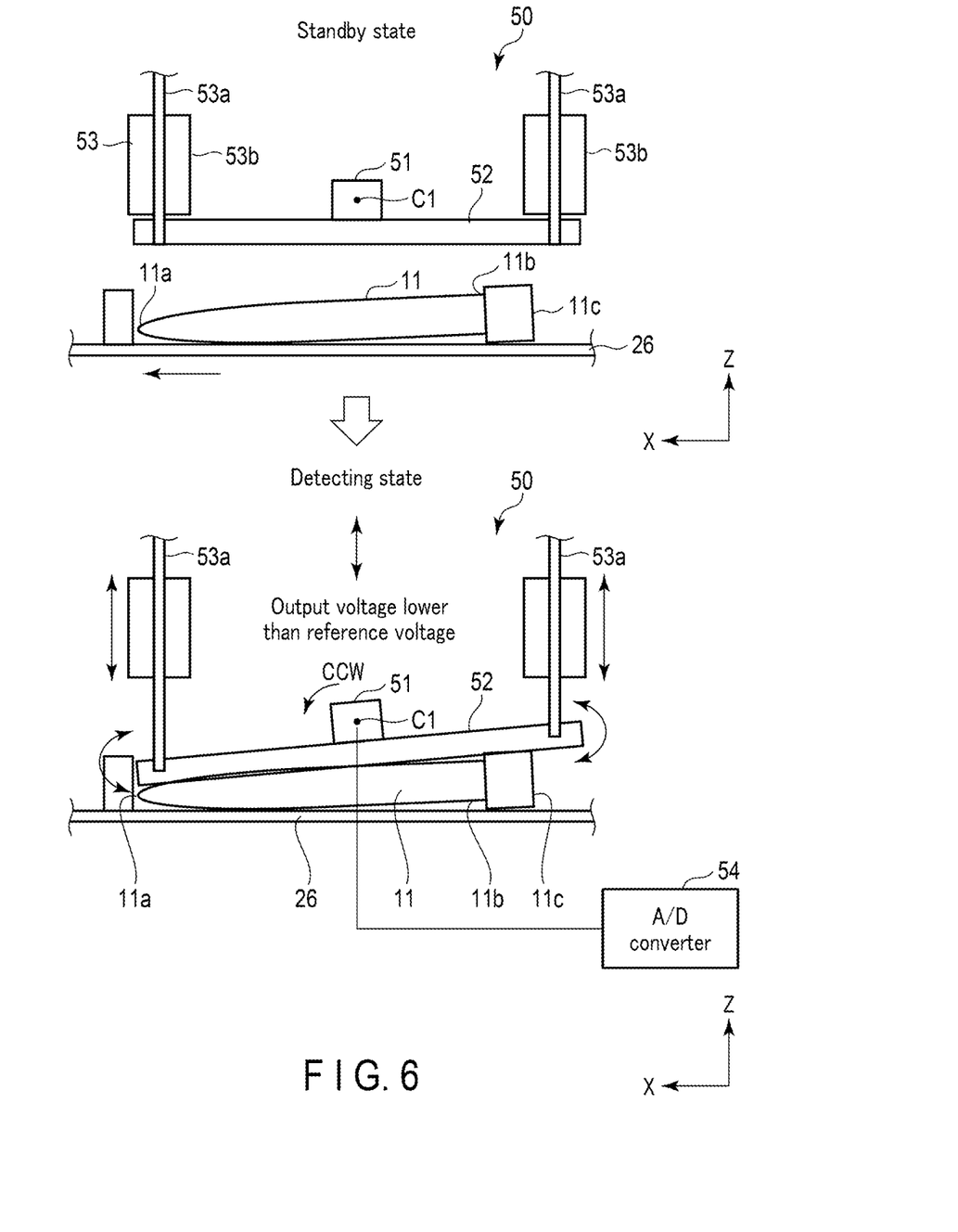
FIG. 6 is a diagram for explaining detection processing according to the embodiment.
Figure 7:
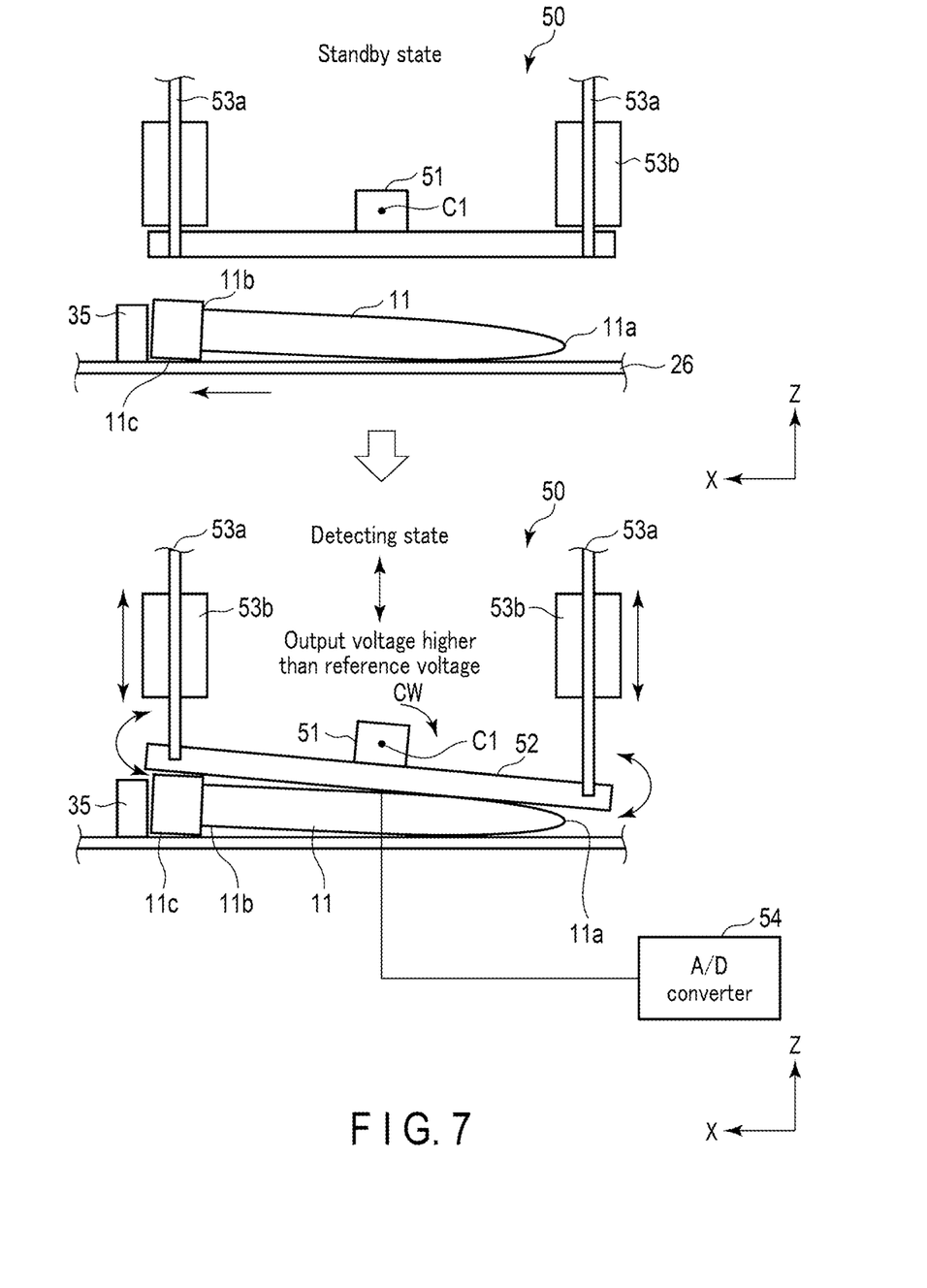
FIG. 7 is another diagram for explaining detection processing according to the embodiment.

FIGS. 6 and 7 are diagrams for explaining detection processing performed by the detection apparatus 50. FIG. 6 shows a standby state (standby position) and a detecting state (detecting position) when the top 11b of container 11 is ahead in the conveyance direction. On the other hand, FIG. 7 shows the standby state (standby position) and the detecting state (detecting position) when the bottom 11a of container 11 is ahead in the conveyance direction. As shown in FIGS. 6 and 7, the detection apparatus 50 includes a tilting member 52 with an inclination sensor 51 mounted thereon, a mover 53 for tiltably moving the tilting member 52, and an A/D converter 54 for converting the output voltage of the inclination sensor 51. The detection apparatus 50 is connected to the controlling section 93.

The detection apparatus 50 is an information processing unit adapted to perform a posture determination operation including: pressing the tilting member 52 with the inclination sensor 51 against the specimen container 11 conveyed in the recumbent state causing the tilting member to be tilted accordingly; and detecting posture information of the specimen container 11 based on the inclination information from the tilting member 52. This inclination information is information representing an outer shape of the specimen container 11 constituted by the portion on the bottom side 11*a* and the portion on the top side 11*b*.

The tilting member 52 may be constituted by a flat plate and adapted to change its position between the standby position and the detecting position by the action of the mover 53. The tilting member 52 includes, as an exemplary structure, an opposing surface (detection surface) that crosses an axis extending in the Z direction and that is intended to be pressed against the outer circumference of the specimen container 11 from above. The tilting member 52 is formed in a shape of a plate or a block having a length approximately equal to the entire length of the specimen container 11 in the X and Y directions. The tilting member 52 is supported by the mover 53 in such a manner that the tilting member 52 is tiltable. The tilting member 52 is pressed against the specimen container 11 from above so that it tilts and has a posture corresponding to the shape of the outer face of the specimen container 11. As such, the tilting member 52 has the opposing surface that serves as a portion following the outer shape of the specimen container 11.

The inclination sensor 51 is disposed on the upper surface of the tilting member 52. The inclination sensor 51 is adapted to output, in response to a change in its posture according to the tilt of the tilting member 52, a voltage corresponding to the angle of inclination. In other words, the inclination sensor 51 detects, as the outer shape information of the specimen container 11, an angle of inclination of the tilting member 52 having the opposing surface following the outer shape of the specimen container 11. In an exemplary implementation, the inclination sensor 51 can detect the angle of rotation about a rotary axis C1 extending along, for example, the Y direction, where the detection angle range is 360°. The inclination sensor 51 outputs an analog voltage corresponding to the inclination angle. The output voltage is input to the controlling section 93 via the A/D converter 54 in the PLC (Programmable Logic Controller).

The embodiment has assumed, by way of example only, the use of product B1N360V-Q20L60-2LU3-H1151 by TURCK, as the inclination sensor 51. For example, the inclination sensor 51 may have an initial setting where it is configured to output a voltage of 0.1 V to 4.9 V for the angle range of 0° to 360°. In an exemplary implementation, the inclination sensor 51 may also have a teaching function and enable setting of resolution for a specific range. Here, for example, a high resolution may be set for a specific angle range so that a voltage of 0.1 V to 4.9 V will be output for desired angle range (with a margin of plus or minus several degrees). Accordingly, the inclination information can be detected with high accuracy by setting an angle range conforming to the shape of a test tube, etc.

The mover 53 forms a floating mechanism that includes guide shafts (support shafts) 53*a*, guide rails 53*b*, and a driver. The mover 53 is connected to the controlling section 93. The mover 53 supports the tilting member 52 at both of its ends in such a manner that swinging movements are permitted at these ends. The mover 53 also moves the tilting member 52 in a predetermined direction.

The guide shafts 53*a* both extend in the Z direction, and their lower ends are coupled to the respective X-direction ends of the tilting member 52 in such a manner as to permit the swinging movements. The guide shafts 53*a* are engaged to the respective guide rails 53*b* and are reciprocatably supported in the Z direction orthogonal to the placement plane of the conveyor belt 26. That is, the tilting member 52 is adapted to move in a direction approaching to or separating from the placement plane where the specimen container 11 is placed.

With the Z-direction reciprocating movements of the guide shafts 53*a* along the guide rails 53*b*, the mover 53 changes the position of the tilting member 52 between the standby position and the detecting position. At the time of detection, the tilting member 52 tilts into a posture that follows the shape of the specimen container 11. More specifically, and for example, due to the difference in position or level between the guide shafts 53*a* (where one guide shaft 53*a* is on the larger diameter side of the specimen container 11 and the other guide shaft 53*a* is on the smaller diameter side of the specimen container 11), the tilting member 52 tilts.

By way of example only, the present embodiment allows for the determination of postures of the specimen containers 11 from their states by taking advantage of each specimen container having the bottom 11*a* and the top 11*b* with the cap 11*c*, which are different in outer diameter from each other.

Supposing an instance where the bottom 11*a* of a smaller diameter is ahead as shown in FIG. 6, the inclination sensor 51 is inclined in a counter-clockwise fashion (in the CCW direction) at the time of detection and may output a voltage lower than a reference voltage. If, on the other hand, the top 11*b* of a larger diameter is ahead as shown in FIG. 7, the inclination sensor 51 is inclined in a clockwise fashion (in the CW direction) at the time of detection and may output a voltage higher than the reference voltage.

Therefore, the controlling section 93 may adopt, as the reference voltage, the voltage output from the inclination sensor 51 when the tilting member 52 is at the standby position. The controlling section 93 then detects the difference between the reference voltage and the output voltage at the time of detection and detects which of the top 11*b* and the bottom 11*a* is positioned ahead based on whether the difference is a positive value or a negative value, so that the posture of the specimen container 11 is detected.

With reference to FIG. 2 the holder conveyor 60 is a conveyance mechanism of a conveyor type similar to the conveyor 20, and set with a predetermined holder conveyance path that passes through an insertion point P6 located under a guide member 86 in the uprighting device 80. The holder conveyance path is a path formed on a holder conveyor belt 62 for the holders 12 to be conveyed, and is set along the Y direction in the drawings. The holder conveyor 60 includes: a pair of guide rails 61 extending along the predetermined holder conveyance path while keeping a constant distance from each other; the aforementioned conveyor belt 62 disposed with the guide rails 61 on the respective sides; conveyance rollers arranged on the underside of the conveyor belt 62 and adapted to be rotationally driven to move the conveyor belt 62; a motor as a drive source for driving the conveyance rollers; and so on.

Each holder 12 includes a holding portion 12*a* with an insertion hole which opens upward, multiple retaining pins 12*b* standing upward from the upper outer circumferential end of the holding portion 12*a*, and a retaining ring 12*c* surrounding the retaining pins 12*b* for retention. The holding portion 12*a* has multiple engagement grooves 12*d* formed on its outer circumference for engagement with the guide rails 61. Empty holders 12 are set on the conveyor belt 62 of the holder conveyor 60 in advance, and sent from the upstream side to the downstream side by the movement of the conveyor belt 62. The holders 12 are each stopped at the insertion point P6 located along the holder conveyance path by a catch mechanism 81, and the specimen containers 11 are inserted into an insertion hole 12e of the respective holders 12 one by one.

The uprighting device 80 includes: the aforementioned catch mechanism 81 adapted to catch the specimen container 11 in the recumbent state and release the specimen container 11; a turning mechanism 82 for raising the specimen container 11 by turning the specimen container 11 so that its bottom 11a comes to the lower side; and an insertion mechanism 83 for inserting the specimen container 11 into the corresponding holder 12 in the upright state.

The catch mechanism 81 includes a pair of retention plates 84 and 85 disposed to face each other for sandwiching the specimen container 11 therebetween. In an exemplary implementation, the pair of retention plates 84 and 85 may be adapted for opening and closing actions in which they approach each other and separate from each other in the Z direction under the control of the controlling section 93. More specifically, the pair of retention plates 84 and 85 can switch between a state of sandwiching the specimen container 11 where they are close to each other and a state of releasing the specimen container 11 where they are adequately apart from each other, for example, by enabling the upper retention plate 84 to move vertically.

The turning mechanism 82 is adapted to turn the catch mechanism 81 retaining the specimen container 11 in both the directions of arrows A1 and A2 indicated in the drawing, about a rotation axis C2 extending along the Y direction. The turning actions of the turning mechanism 82 are controlled by the controlling section 93. In which direction the turning action should be made is determined based on the information detected by the detection apparatus 50. More specifically, the turning direction is determined to be either the direction of arrow A1 or the direction of arrow A2 according to the detected orientation of the specimen container 11, so that a 90° turning action can bring the specimen container 11 into a position where the bottom 11a is on the lower side and the top 11b with the cap 11c is on the upper side.

Figure 8:
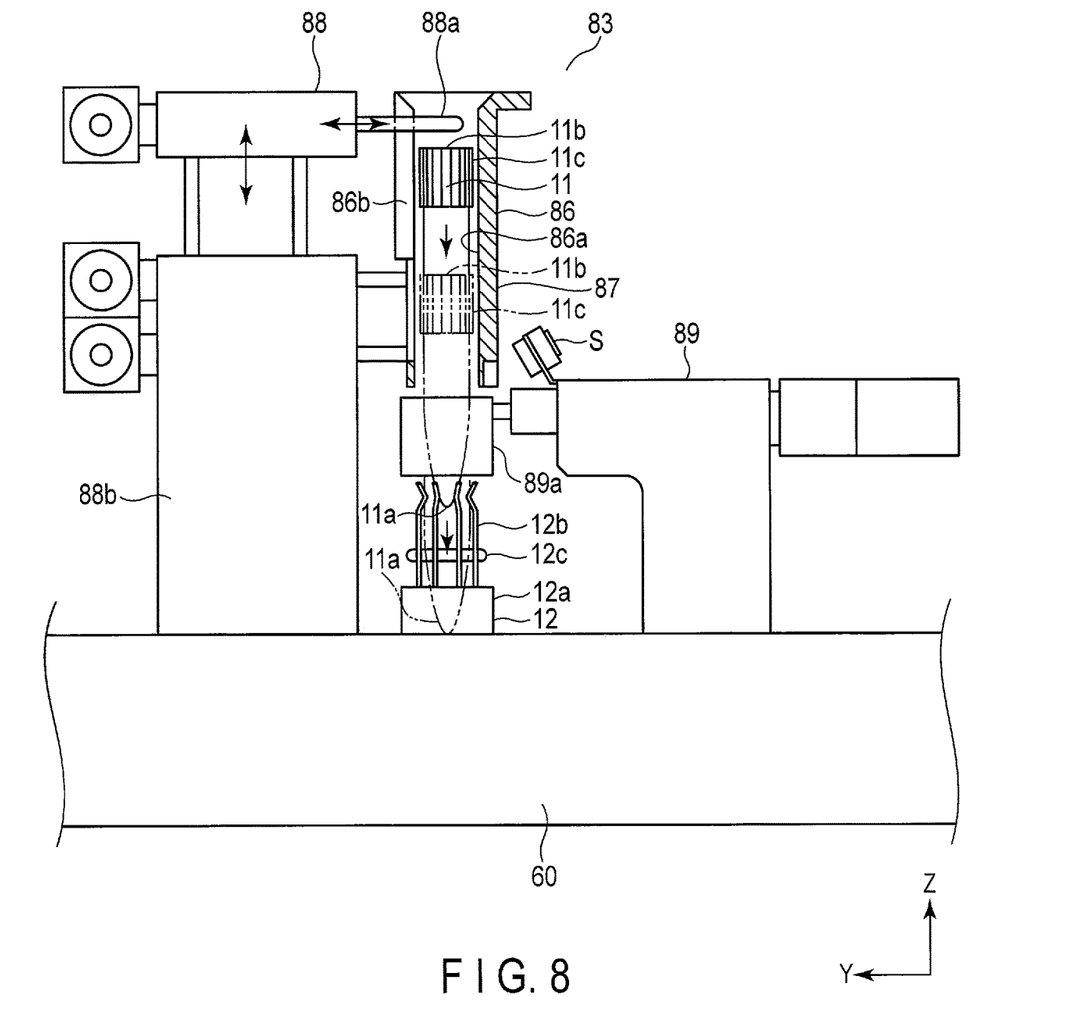
FIG. 8 is a side view of an uprighting device according to the embodiment.
Figure 9:
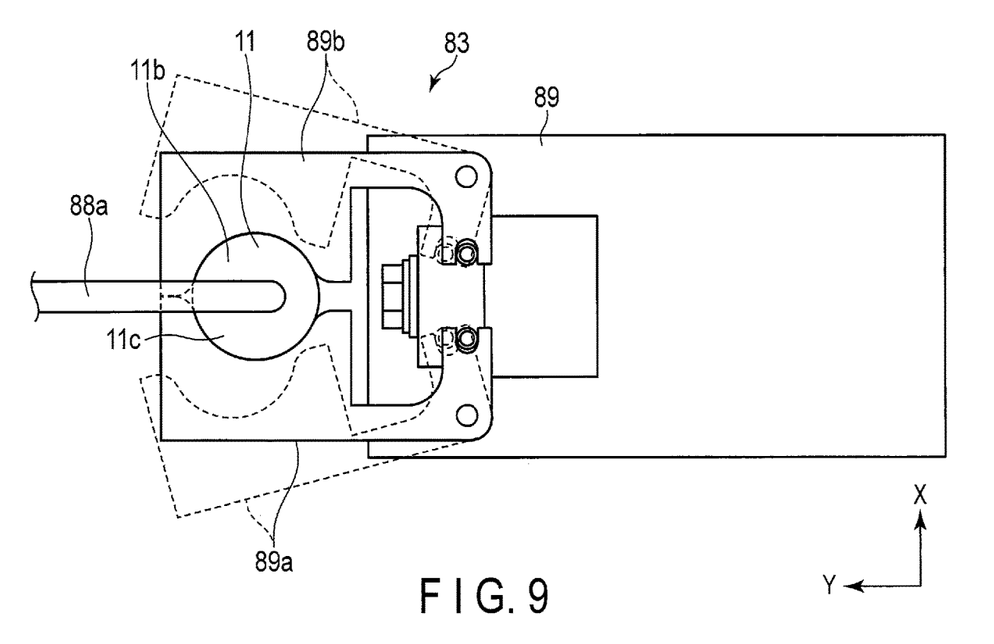
FIG. 9 is a plan view of a part of the uprighting device according to the embodiment.

FIG. 8 is a side view of the uprighting device 80, in particular the insertion mechanism 83, and shows a part thereof in cross section. FIG. 9 is a top plan view of the insertion mechanism 83. As shown in FIGS. 8 and 9, the insertion mechanism 83 includes a guide mechanism 87 for regulating the movement of the specimen container 11 to a downward movement along the Z direction, and a push-down mechanism 88 for pushing down the specimen container 11. The guide mechanism 87 includes a cylindrical guide member 86 arranged below the turning mechanism 82, and a support 89 arranged below the guide member 86. The guide member 86 is of a cylindrical shape with a hole 86a extending in the Z direction. The guide member 86 has a slit 86b longitudinally cut out in a part of its circumferential wall for permitting the movement of a blade 88a.

The support 89 includes a pair of retention pieces 89a and 89b adapted to open and close by their respective swinging actions. The support 89 serves as a chuck mechanism that can open and close at given timings under the control of the controlling section 93. The support 89 provides, from the periphery, support for the specimen container 11 being pushed down by the push-down mechanism 88, and regulates the movement of the specimen container 11 to a vertical movement.

The push-down mechanism 88 includes the aforementioned blade 88a which is adapted to move back and forth (enter and retreat), and a drive source 88b, such as an air cylinder, for causing the blade 88a to ascend and descend. The blade 88a can move between an intervening position where it has entered the conveyance path for the specimen container 11 that is supported by the guide mechanism 87, and a retreat position where it is away from the conveyance path. With the blade 88a descending at the intervening position, the specimen container 11 is pushed down by the force applied to the cap 11c at the top 11b, so that the specimen container 11 is inserted into the empty holder 12 that is set in the holder conveyor 60 below.

Next, the specimen processing method according to the embodiment will be described. The specimen processing method according to the embodiment includes performing processes which are: a feed process to feed, by the feeder 40, multiple specimen containers 11 to the conveyance path one by one; a conveyance process to sequentially send, by the conveyor 20, the specimen containers 11 in their recumbent state to each process position; a detection process to detect, by the detection apparatus 50, the posture of each recumbent-state specimen container 11; an uprighting process to catch the specimen container 11 by the catch mechanism 81 of the uprighting device 80 and turn the specimen container 11 by the turning mechanism 82 so that the specimen container 11 is raised to an upright state; and an insertion process to insert, by the insertion mechanism 83 of the uprighting device 80, the upright-state specimen container 11 into the holder 12 positioned beneath. These processes are controlled by the controlling section 93 and performed for each specimen as a series of processes including the feed, conveyance, detection, catch, turn, release, and holder insertion processes in order.

Multiple specimen containers 11 are accommodated in the housing space 41c of the housing box 41. For example, the specimen containers 11 are randomly tossed into the housing box 41 through the feed port 41a by hand, etc., after blood sampling. In this instance, the specimen containers 11 are gathered toward a gathering point P1 at the lower end portion on the side of the discharge port 41b, by the inclined plate 45 within the housing space 41c.

For the feed and conveyance processes, the controlling section 93 causes the lifting plate 43 and the auxiliary block 44 to ascend and descend at predetermined time intervals, and together causes the opening-closing door 42 to open and close at predetermined time intervals. With the ascending actions of the lifting plate 43, the specimen containers 11 that have been gathered at the bottom of the housing space 41c on the side of the discharge port 41b are lifted up one by one, and sequentially brought to a lifted-up point P2 at the back of the opening-closing door 42. The specimen containers 11 are then sequentially dropped from the opened opening-closing door 42 and are fed onto a feed point P3 on the conveyor belt 26 placed below the discharge port 41b.

Also, the ascending and descending actions of the lifting plate 43 and the auxiliary block 44 facilitate the movement of the specimen containers 11 and can accordingly deliver the specimen containers 11 onto the top face 43a of the lifting plate 43 sequentially and one by one. By repeating these actions, the randomly-housed specimen containers 11 are automatically sent to the feed point P3 one by one in order at given time intervals, with their longitudinal directions aligned in the X direction. At this point, either the top 11b or the bottom 11a of each specimen container 11 has been positioned ahead in the conveyance direction, although which of the top 11b and the bottom 11a will be positioned ahead is not fixed.

The controlling section 93 conducts the conveyance process in such a manner that the conveyor belt 26 repeats the set of a forward movement and a stop at predetermined time intervals, and the push-out mechanism 22 and the stopper mechanism 23 perform entering and retreating movements of their blades 31 and 34 and also the forward and backward movements of the blade 31. The specimen container 11 that has been positioned at the feed point P3 is sent forward by the forward movement of the conveyor belt 26 upon a retreating action of the blade 34 of the stopper mechanism 23. The specimen container 11 thus reaches a detection point P4 where it is stopped by the stopper mechanism 24 through contact with the abutment surface 35a of the abutment block 35 provided at the blade 134. During this stopped state, the controlling section 93 controls the detection apparatus 50 to move the tilting member 52 to the detecting position and detect the output voltage of the inclination sensor 51 inclined together with the tilting member 52 by the action of the floating mechanism.

Here, the output voltage of the inclination sensor 51 acquired when the tilting member 52 is at the standby position is adopted as the reference voltage, and the difference between the reference voltage and the output voltage that has been acquired at the time of detection is calculated to determine the inclination direction of the inclination sensor 51. Based on the outcome for the inclination sensor 51, the posture of the specimen container 11, that is, which of the top 11b and the bottom 11a is ahead is determined (detected).

For example, it will be assumed that the inclination sensor 51 is in the horizontal state when the tilting member 52 is at the standby position, and the voltage output from the inclination sensor 51 in this horizontal state is set as the reference voltage. Then, if the bottom 11a is positioned ahead as shown in FIG. 6, subtracting the reference voltage value from the output voltage value of the inclination sensor 51 gives a negative value. On the other hand, if the top 11b with the cap 11c is positioned ahead as shown in FIG. 7, subtracting the reference voltage value from the output voltage value of the inclination sensor 51 gives a positive value. In such cases, if a negative value is given, the specimen container 11 is determined to be in the posture with its bottom 11a positioned ahead, and if a positive value is given, the specimen container 11 is determined to be in the posture with its top 11b positioned ahead. Note that the correspondence between the detection values and the postures may be discretionarily changed by configuration. As a matter of course, the postures may be associated with positive and negative values in the manner opposite to the foregoing description.

Based on the detection result from the detection apparatus 50, the controlling section 93 determines in which direction the turning at the uprighting device 80 should be performed so that the bottom 11a of the specimen container 11 will come to the lower side.

Upon completing the detection process, the stopper mechanism 24 is released to retreat its blade 134 and the guide screw 32 is rotated while the blade 31 of the push-out mechanism 22 stays at the intervening position, so that the specimen container 11 is pushed out and delivered to a catch point P5 located ahead of it.

The controlling section 93 controls the catch mechanism 81 to repeat catch and release actions for the specimen containers 11 at given timings. Also, the controlling section 93 turns the turning mechanism 82 in the state of retaining the specimen container 11 by 90° in the intended direction, so as to raise the specimen container 11 to an upright state.

As to this turning direction, the controlling section 93 controls it according to the posture of the specimen container 11 that has been detected using the detection apparatus 50, so that the bottom 11a comes to the lower side after the turning. For example, if the specimen container 11 is in the posture with the top 11b positioned ahead in the conveyance direction, the turning mechanism 82 is caused to turn in the first turning direction A1, namely, in the clockwise direction in the drawings. If the specimen container 11 is in the posture with the bottom 11a positioned ahead in the conveyance direction, the turning mechanism 82 is caused to turn in the second turning direction A2, namely, in the counter-clockwise direction in the drawings.

The specimen container 11 is turned into the upright state by the turning mechanism 82, and dropped down upon release from the catch mechanism 81 (cancellation of the caught state). Guided by the guide hole 86a of the guide member 86 provided below the catch mechanism 81, the specimen container 11 is sent to the insertion point P6. The conveyor belt 62 of the holder conveyor 60 extends at the insertion point P6, where empty holders 12 are set in advance.

The controlling section 93 controls the holder conveyor 60 to repeat the set of a forward movement and a stop of the conveyor belt 62 at given timings. Together, the controlling section 93 controls the guide mechanism 87 of the insertion mechanism 83 to repeat the set of a periphery supporting action and a releasing action for the specimen containers 11, and also controls the push-down mechanism 88 for the entry and retreat movements and the ascending and descending movements of the blade 88a. With this operation, the specimen containers 11 individually sent to the insertion point P6 in their upright state are each pushed downward with guidance and sequentially inserted into the respective empty holders 12 provided from the upstream side of the holder conveyance path. Then, the holders 12 inserted with the specimen containers 11 are sent to the downstream side according to the forward movement of the holder conveyor 60.

The specimen processing apparatus 10 and the specimen processing method according to the present embodiment, employ the inclination sensor 51 to enable fast detection of the orientations of the specimen containers 11 so that improved efficiency in processing can be realized. More specifically, the orientation of the specimen container 11 can be easily detected simply by applying the tilting member 52 having the inclination sensor 51 mounted thereon to the specimen container 11 placed on the conveyor belt 26, and therefore, the embodiment allows for the detection operation involving only a few actions while providing accurate detection performance. The determination is made based on the distinction between the bottom 11a and the top 11b of each specimen container 11, and as such, a simple equipment allows for the easy detection of the posture of the specimen containers 11. Consequently, a large number of specimen containers 11 can be handled such that they can efficiently undergo a variety of subsequent processes with their orientations aligned. Moreover, with the specimen processing apparatus 10 according to the embodiment, a large number of randomly introduced specimen containers 11 are automatically conveyed in their recumbent state by the feeder 40 and are subjected to the orientation detection by the detection apparatus 50. Thus, the specimen containers can be automatically arranged in a sortable fashion and set up in the same orientation, and improved efficiency in specimen processing is realized.

The detection apparatus 50 is of a simple configuration including the tilting member 52 to be applied to the specimen container 11 placed on the conveyance path. As such, the embodiment is not bound by shapes of the specimen containers 11 in implementation, and the embodiment can cope with specimen containers 11 of various sizes and shapes. For example, it is possible to handle specimen containers 11 of various shapes only by setting the correspondence between the angles of the inclination sensor 51 and the orientations of the specimen containers 11 to be used, and therefore, a high versatility is offered. Also, since the inclination sensor 51 may have a teaching function to enhance the resolution for a specific angle range by configuration, even more accurate and precise detections can be realized.

Note that the present invention is not limited to the foregoing embodiments as they are. The foregoing description does not intend to limit, for example, the shapes of the specimen containers 11. The intended determination is possible if each specimen container 11 has a shape that gives different inclination angles to the tilting member 52 according to the change in posture, when the tilting member 52 is applied to its outer face. Examples of adoptable shapes include a shape which gradually increases in diameter toward the side of the opening in the axial direction, a shape which has a large-diameter flange near the opening part while the rest is of a small diameter, and so on, because such shapes each give an inclination rising toward the side of the top. Likewise, shapes having a top portion and a bottom portion differing in outline from each other (due to the presence of a cap or a shape of the opening) can also be subjected to the intended determination.

The foregoing embodiments have assumed the use of a reference value for detecting an inclination based on whether the difference from the reference value is a positive value or a negative value, but this is not a limitation. Modifications may be suitably made according to the specifications of inclination sensors. Also, the foregoing embodiments have assumed the arrangement where the inclination sensor 51 is disposed for the outer face of the specimen container 11 with the block-shaped tilting member 52 interposed therebetween, but this is not a limitation. As another exemplary arrangement, the inclination sensor 51 may be disposed to face the specimen container 11 while being supported by a floating mechanism, so that it can contact and separate from the outer face of the specimen container 11 and incline accordingly. Also in this case, detecting the inclination information of the inclination sensor 51 allows for the detection of the posture of the specimen container 11.

The present invention is not limited to the above embodiments as they are. For practical implementation, the invention can be embodied while modifying its components without departing from the gist of the invention. The components discussed for the foregoing embodiments may be suitably omitted, or changes may be suitably made to the shapes, structures, materials, etc. of the components. Various inventions may also be formed from appropriate combinations of the components discussed for the foregoing embodiments.

The invention claimed is:

1. A detection apparatus comprising:
an inclination sensor, at a tilting member comprising a detection surface facing an outer face of a specimen container, arranged to be capable of inclining according to an outer shape of the specimen container;
a mover supporting the tilting member in such a manner that the tilting member is tiltable, the mover configured to move the tilting member between a detecting position where the detection surface contacts the outer face of the specimen container and a standby position where the detection surface is away from the specimen container;
wherein the inclination sensor is configured to detect inclination information; and
an information processor is configured to detect posture information of the specimen container based on the inclination information.

2. The detection apparatus according to claim 1, wherein the specimen container varies an outer diameter along an axial direction,
the tilting member is a plate member, and
the mover comprises a support shaft coupled to the plate member, a driver configured to reciprocate the support shaft, and a guide rail configured to guide the support shaft to move in a direction to approach or separate from the outer face of the specimen container.

3. A specimen processing apparatus comprising:
the detection apparatus according to claim 2;
a conveyor configured to convey the specimen container in a recumbent state to a point for detection by the inclination sensor; and
a sorting device configured to align the orientation of the specimen container based on the posture information of the specimen container.

4. A specimen processing apparatus comprising:
the detection apparatus according to claim 1;
a conveyor configured to convey the specimen container in a recumbent state to a point for detection by the inclination sensor; and
a sorting device configured to align the orientation of the specimen container based on the posture information of the specimen container.

5. The specimen processing apparatus according to claim 4, wherein
the information processor is a controller configured to control the sorting device to change the posture of the specimen container based on the posture information so that a bottom of the specimen container is positioned on a lower side, and
the sorting device comprises a catch mechanism configured to catch the specimen container in the recumbent state and release the specimen container, and a turning mechanism configured to turn the catch mechanism to raise the specimen container.

6. A specimen processing apparatus comprising:
the detection apparatus according to claim 1;
a conveyor configured to convey the specimen container in a recumbent state to a point for detection by the inclination sensor; and
a sorting device configured to align the orientation of the specimen container based on the posture information of the specimen container.

7. A specimen processing method comprising:
conveying a specimen container in a recumbent state along a predetermined conveyance path;
detecting, by an inclination sensor, inclination information according to an outer shape of the specimen container, wherein the inclination sensor is at a tilting member comprising a detection surface facing an outer face of the specimen container;

moving, by a mover supporting the tilting member, the tilting member between a detection position where the detection surface contact the outer face of the specimen container and a standby position where the detection surface is away from the specimen container;
detecting posture information of the specimen container based on the inclination information; and
aligning, by a turning mechanism configured to turn the specimen container in the recumbent state, the orientation of the specimen container based on the detected posture information of the specimen container.

* * * * *